(12) United States Patent
Engel et al.

(10) Patent No.: US 9,137,525 B2
(45) Date of Patent: Sep. 15, 2015

(54) MULTILAYER VIDEO SCREEN

(75) Inventors: Gabriel Darmon Engel, Hamilton (NZ); Gareth Paul Bell, Hamilton (NZ)

(73) Assignee: PURE DEPTH LIMITED, Auckland (NZ)

( * ) Notice: Subject to any disclaimer, the term of this patent is extended or adjusted under 35 U.S.C. 154(b) by 1205 days.

(21) Appl. No.: 10/521,413

(22) PCT Filed: Jul. 15, 2003

(86) PCT No.: PCT/NZ03/00153
§ 371 (c)(1),
(2), (4) Date: Jul. 19, 2006

(87) PCT Pub. No.: WO2004/008226
PCT Pub. Date: Jan. 22, 2004

(65) Prior Publication Data
US 2006/0290594 A1 Dec. 28, 2006

(30) Foreign Application Priority Data
Jul. 15, 2002 (NZ) .......................................... 520132

(51) Int. Cl.
*G09G 5/00* (2006.01)
*H04N 13/04* (2006.01)
*G02B 27/60* (2006.01)
*G02F 1/1347* (2006.01)
*G02F 1/1343* (2006.01)

(52) U.S. Cl.
CPC ............ *H04N 13/0495* (2013.01); *G02B 27/60* (2013.01); *G02F 1/1347* (2013.01); *G02F 1/134336* (2013.01)

(58) Field of Classification Search
CPC .. G02B 27/60; H04N 13/0495; G02F 1/1347; G02F 1/134336
USPC .......................................... 345/4; 349/73, 115
See application file for complete search history.

(56) References Cited

U.S. PATENT DOCUMENTS

| | | |
|---|---|---|
| 2,543,793 A | 3/1951 | Marks |
| 2,961,486 A | 11/1960 | Marks |
| 3,536,921 A | 10/1970 | Caulfield |
| 3,605,594 A | 9/1971 | Gerritsen |
| 3,622,224 A | 11/1971 | Wysocki et al. |
| 3,863,246 A | 1/1975 | Tricka et al. |
| 3,891,305 A | 6/1975 | Fader |
| 3,918,796 A | 11/1975 | Fergason |
| 3,940,788 A | 2/1976 | Abe et al. |
| 3,955,208 A | 5/1976 | Wick et al. |
| 3,992,082 A | 11/1976 | Katz |

(Continued)

FOREIGN PATENT DOCUMENTS

| | | |
|---|---|---|
| AU | 24806/00 | 7/2000 |
| AU | 24538/00 | 8/2000 |

(Continued)

OTHER PUBLICATIONS

Office Action U.S. Appl. No. 10/475,432 Mail Date Aug. 28, 2008.

(Continued)

*Primary Examiner* — Charles V Hicks

(57) ABSTRACT

A display device comprising at least two display layers at least in part overlapping in which at least one of said display layers has a dissimilar configuration to the other display layer(s) such that moiré interference is reduced.

27 Claims, 10 Drawing Sheets

(56) References Cited

U.S. PATENT DOCUMENTS

| | | |
|---|---|---|
| 4,153,654 A | 5/1979 | Maffitt et al. |
| 4,165,922 A | 8/1979 | Morrissy |
| 4,190,856 A | 2/1980 | Ricks |
| 4,239,349 A | 12/1980 | Scheffer |
| 4,281,341 A | 7/1981 | Byatt |
| 4,294,516 A | 10/1981 | Brooks |
| 4,333,715 A | 6/1982 | Brooks |
| 4,447,141 A | 5/1984 | Eisenkraft |
| 4,448,489 A | 5/1984 | Sato et al. |
| 4,472,737 A | 9/1984 | Iwasaki |
| 4,523,848 A | 6/1985 | Gorman et al. |
| 4,541,692 A | 9/1985 | Collins et al. |
| 4,613,896 A | 9/1986 | Takita et al. |
| 4,648,691 A | 3/1987 | Oguchi et al. |
| 4,649,425 A | 3/1987 | Pund |
| 4,670,744 A | 6/1987 | Buzak |
| 4,734,295 A | 3/1988 | Liu |
| 4,736,214 A | 4/1988 | Rogers |
| 4,768,300 A | 9/1988 | Rutili |
| 4,792,850 A | 12/1988 | Liptoh et al. |
| 5,032,007 A | 7/1991 | Silverstein et al. |
| 5,046,826 A | 9/1991 | Iwamoto et al. |
| 5,046,827 A | 9/1991 | Frost et al. |
| 5,086,354 A | 2/1992 | Bass et al. |
| 5,107,352 A | 4/1992 | Fergason |
| 5,112,121 A | 5/1992 | Chang et al. |
| 5,124,803 A | 6/1992 | Troxel |
| 5,132,839 A | 7/1992 | Travis |
| 5,132,878 A | 7/1992 | Carey |
| 5,261,404 A | 11/1993 | Mick et al. |
| 5,337,181 A | 8/1994 | Kelly |
| 5,367,801 A | 11/1994 | Ahn |
| 5,473,344 A | 12/1995 | Bacon et al. |
| 5,537,233 A | 7/1996 | Miura et al. |
| 5,557,684 A | 9/1996 | Wang et al. |
| 5,583,674 A | 12/1996 | Mosley |
| 5,585,821 A | 12/1996 | Ishikura et al. |
| 5,589,980 A | 12/1996 | Bass et al. |
| 5,600,462 A | 2/1997 | Suzuki et al. |
| 5,689,316 A | 11/1997 | Hattori et al. |
| 5,695,346 A | 12/1997 | Sekiguchi et al. |
| 5,706,139 A | 1/1998 | Kelly |
| 5,745,197 A | 4/1998 | Leung et al. |
| 5,751,385 A | 5/1998 | Heinze |
| 5,764,317 A | 6/1998 | Sadovnik et al. |
| 5,796,455 A | 8/1998 | Mizobata et al. |
| 5,796,509 A | 8/1998 | Doany et al. |
| 5,822,021 A | 10/1998 | Johnson et al. |
| 5,825,436 A | 10/1998 | Knight |
| 5,838,308 A | 11/1998 | Knapp et al. |
| 5,924,870 A | 7/1999 | Brosh et al. |
| 5,956,180 A | 9/1999 | Bass et al. |
| 5,976,297 A | 11/1999 | Oka et al. |
| 5,990,990 A | 11/1999 | Crabtree |
| 6,005,654 A | 12/1999 | Kipfer et al. |
| 6,018,379 A | 1/2000 | Mizobata et al. |
| 6,061,110 A | 5/2000 | Hisatake et al. |
| 6,067,137 A | 5/2000 | Ohnishi et al. |
| 6,100,862 A | 8/2000 | Sullivan |
| 6,114,814 A | 9/2000 | Shannon et al. |
| 6,122,103 A | 9/2000 | Perkins et al. |
| 6,141,067 A | 10/2000 | Ikka |
| 6,147,741 A | 11/2000 | Chen et al. |
| 6,204,902 B1 | 3/2001 | Kim et al. |
| 6,239,852 B1 | 5/2001 | Oono et al. |
| 6,287,712 B1 | 9/2001 | Bulovic et al. |
| 6,300,990 B1 | 10/2001 | Yamaguchi et al. |
| 6,326,738 B1 | 12/2001 | McAndrew |
| 6,341,439 B1 | 1/2002 | Lennerstad |
| 6,351,298 B1 | 2/2002 | Mitsui et al. |
| 6,377,306 B1 | 4/2002 | Johnson et al. |
| 6,392,725 B1 | 5/2002 | Harada et al. |
| 6,412,953 B1 | 7/2002 | Tiao et al. |
| 6,414,728 B1 | 7/2002 | Faris et al. |
| 6,443,579 B1 | 9/2002 | Myers |
| 6,489,044 B1 | 12/2002 | Chen et al. |
| 6,504,587 B1 | 1/2003 | Morishita et al. |
| 6,512,559 B1 | 1/2003 | Hashimoto et al. |
| 6,515,881 B2 | 2/2003 | Chou et al. |
| 6,557,999 B1 | 5/2003 | Shimizu |
| 6,562,440 B1 | 5/2003 | Tsuchiya et al. |
| 6,573,961 B2 * | 6/2003 | Jiang et al. .................. 349/115 |
| 6,578,985 B1 | 6/2003 | Seraphim et al. |
| 6,590,605 B1 | 7/2003 | Eichenlaub |
| 6,593,904 B1 | 7/2003 | Marz et al. |
| 6,609,799 B1 | 8/2003 | Myers |
| 6,639,349 B1 | 10/2003 | Bahadur |
| 6,679,613 B2 | 1/2004 | Mabuchi |
| 6,693,692 B1 | 2/2004 | Kaneko et al. |
| 6,771,327 B2 | 8/2004 | Sekiguchi |
| 6,812,649 B2 | 11/2004 | Kim |
| 6,845,578 B1 | 1/2005 | Lucas |
| 6,897,855 B1 * | 5/2005 | Matthies et al. ............. 345/204 |
| 6,906,762 B1 * | 6/2005 | Witehira et al. ............... 349/73 |
| 6,947,024 B2 | 9/2005 | Lee et al. |
| 7,072,095 B2 * | 7/2006 | Liang et al. .................. 359/296 |
| 7,205,355 B2 * | 4/2007 | Liang et al. .................. 524/474 |
| 7,262,752 B2 | 8/2007 | Weindorf |
| 7,352,424 B2 | 4/2008 | Searle |
| 7,372,447 B1 | 5/2008 | Jacobsen et al. |
| 2001/0040652 A1 | 11/2001 | Hayashi |
| 2002/0027608 A1 | 3/2002 | Johnson et al. |
| 2002/0047601 A1 | 4/2002 | Shannon et al. |
| 2002/0064037 A1 | 5/2002 | Lee |
| 2002/0075211 A1 * | 6/2002 | Nakamura ...................... 345/87 |
| 2002/0105516 A1 | 8/2002 | Tracy |
| 2002/0111195 A1 | 8/2002 | Kweon et al. |
| 2002/0154102 A1 * | 10/2002 | Huston ......................... 345/204 |
| 2002/0163728 A1 | 11/2002 | Myers |
| 2002/0163729 A1 | 11/2002 | Myers |
| 2003/0043106 A1 | 3/2003 | Woo |
| 2003/0132895 A1 | 7/2003 | Berstis |
| 2003/0184665 A1 | 10/2003 | Berstis |
| 2004/0012708 A1 | 1/2004 | Matherson |
| 2005/0146787 A1 | 7/2005 | Lukyanitsa |
| 2006/0103951 A1 | 5/2006 | Bell et al. |

FOREIGN PATENT DOCUMENTS

| | | |
|---|---|---|
| AU | 68219/01 | 12/2001 |
| CA | 2009960 | 9/1990 |
| CA | 2020372 | 1/1991 |
| CA | 2345128 | 3/2000 |
| CN | 1356584 | 7/2002 |
| CN | 1369997 | 9/2002 |
| DE | 2730785 | 1/1979 |
| DE | 19757378 | 7/1998 |
| DE | 29912074 | 11/1999 |
| DE | 19920789 | 5/2000 |
| DE | 19916747 | 10/2000 |
| EP | 76651 | 4/1983 |
| EP | 0 195 584 | 9/1986 |
| EP | 409188 | 7/1989 |
| EP | 0 336 351 | 10/1989 |
| EP | 0389123 | 9/1990 |
| EP | 454423 | 10/1991 |
| EP | 595387 | 5/1994 |
| EP | 0802684 | 10/1997 |
| EP | 1116070 | 3/2000 |
| EP | 0999088 | 5/2000 |
| EP | 1151430 | 8/2000 |
| EP | 1155351 | 8/2000 |
| EP | 1046944 | 10/2000 |
| EP | 1081774 | 3/2001 |
| EP | 1093008 | 4/2001 |
| EP | 2000/733927 | 7/2001 |
| EP | 1231757 | 8/2002 |
| EP | 1271944 | 1/2003 |
| EP | 1287401 | 3/2003 |
| EP | 1923860 | 5/2008 |
| GB | 1 448 520 | 9/1976 |
| GB | 2107482 | 4/1983 |
| GB | 2312584 | 10/1997 |
| GB | 2314943 | 1/1998 |

(56) References Cited

FOREIGN PATENT DOCUMENTS

| | | |
|---|---|---|
| GB | 2347003 | 8/2000 |
| GB | 2372618 | 8/2002 |
| IL | 93472 | 11/1994 |
| JP | 49096628 | 1/1973 |
| JP | 56-007916 | 1/1981 |
| JP | 56-7916 | 9/1981 |
| JP | 57-119389 | 7/1982 |
| JP | 60024502 | 2/1985 |
| JP | 60-103895 | 6/1985 |
| JP | 60-122920 | 7/1985 |
| JP | 60211830 | 10/1985 |
| JP | 60-233684 | 11/1985 |
| JP | 60-244924 | 12/1985 |
| JP | 61-166524 | 7/1986 |
| JP | 61-200783 | 9/1986 |
| JP | 62-067094 | 3/1987 |
| JP | 62-122494 | 6/1987 |
| JP | 62-161294 | 7/1987 |
| JP | 62-191819 | 8/1987 |
| JP | 62-191820 | 8/1987 |
| JP | 62-235929 | 10/1987 |
| JP | 63-100898 | 5/1988 |
| JP | 63-203088 | 8/1988 |
| JP | 63-274918 | 8/1988 |
| JP | 63-318856 | 12/1988 |
| JP | 2-262119 | 10/1990 |
| JP | 03-002835 | 1/1991 |
| JP | 3021902 | 1/1991 |
| JP | 3-101581 | 4/1991 |
| JP | 3148622 | 6/1991 |
| JP | 3174580 | 7/1991 |
| JP | 3-233548 | 10/1991 |
| JP | 3226095 | 10/1991 |
| JP | 4-034521 | 2/1992 |
| JP | 4-034595 | 2/1992 |
| JP | 04-107540 | 4/1992 |
| JP | 4191755 | 7/1992 |
| JP | 5-007373 | 1/1993 |
| JP | 5-091545 | 4/1993 |
| JP | 5-142515 | 6/1993 |
| JP | 6-233328 | 8/1994 |
| JP | 63-039299 | 11/1994 |
| JP | 7006827 | 1/1995 |
| JP | 8-076139 | 3/1995 |
| JP | 7146473 | 6/1995 |
| JP | 07-198921 | 8/1995 |
| JP | 07-198942 | 8/1995 |
| JP | 7-209573 | 8/1995 |
| JP | 7-222202 | 8/1995 |
| JP | 8-036375 | 2/1996 |
| JP | 08335043 | 12/1996 |
| JP | 09-033858 | 2/1997 |
| JP | 9-043540 | 2/1997 |
| JP | 9-096789 | 4/1997 |
| JP | 9-102969 | 4/1997 |
| JP | 9-133893 | 5/1997 |
| JP | 09211392 | 8/1997 |
| JP | 9-282357 | 10/1997 |
| JP | 9-308769 | 12/1997 |
| JP | 10-003355 | 1/1998 |
| JP | 10039821 | 2/1998 |
| JP | 10-105829 | 4/1998 |
| JP | 10-228347 | 8/1998 |
| JP | 10232304 | 9/1998 |
| JP | 10-312033 | 11/1998 |
| JP | 11-066306 | 3/1999 |
| JP | 11-202793 | 7/1999 |
| JP | 11-205822 | 7/1999 |
| JP | 2000-075135 | 3/2000 |
| JP | 2000-111940 | 4/2000 |
| JP | 2000-113988 | 4/2000 |
| JP | 2000-142173 | 5/2000 |
| JP | 2001-56410 | 2/2001 |
| JP | 2002014772 | 1/2002 |
| JP | 2002-504764 | 2/2002 |
| JP | 2001-215332 | 4/2002 |
| JP | 2002-097269 | 4/2002 |
| JP | 2001-42310 | 8/2002 |
| JP | 2002-258284 | 9/2002 |
| JP | 2002-287144 | 10/2002 |
| JP | 2002-350772 | 12/2002 |
| JP | 2002-099223 | 10/2003 |
| JP | 2002-156608 | 12/2003 |
| NO | 20005178 | 4/2001 |
| PL | 343229 | 4/2001 |
| WO | 91/12554 | 8/1991 |
| WO | 91-12554 | 8/1991 |
| WO | 91-15930 | 10/1991 |
| WO | 91/15930 | 10/1991 |
| WO | 92/09003 | 5/1992 |
| WO | 92-09003 | 5/1992 |
| WO | 9627992 | 9/1996 |
| WO | 97/14987 | 4/1997 |
| WO | 9703025 | 11/1997 |
| WO | 98-04087 | 1/1998 |
| WO | 98/04087 | 1/1998 |
| WO | 98/16869 | 4/1998 |
| WO | 98-16869 | 4/1998 |
| WO | 98/47106 | 10/1998 |
| WO | 99/42889 | 8/1999 |
| WO | 99/44095 | 9/1999 |
| WO | 00/17708 | 3/2000 |
| WO | 00/36578 | 6/2000 |
| WO | 00/48167 | 8/2000 |
| WO | 00/49453 | 8/2000 |
| WO | 01/15128 | 3/2001 |
| WO | 01/95019 | 12/2001 |
| WO | 02/35277 | 5/2002 |
| WO | 02/091033 | 11/2002 |
| WO | 03/003109 | 1/2003 |

OTHER PUBLICATIONS

Office Action U.S. Appl. No. 10/492,624 Mail Date Jan. 5, 2009.
Office Action U.S. Appl. No. 10/492,624 Mail Date Aug. 1, 2007.
Office Action U.S. Appl. No. 10/508,726 Mail Date May 1, 2008.
Office Action U.S. Appl. No. 10/528,334 Mail Date Aug. 5, 2008.
Office Action U.S. Appl. No. 10/528,334 Mail Date Feb. 24, 2009.
"Clearboard 1991-1994," http://web.media.mit.edu/~ishii/CB.html.
"Teamworkstation 1989-1994," http://web.media.mit.edu/~ishii/TWS.html.
"Textarc: An Alternate Way to View a Text," http://textarc.org.
"Textarc: NYSCA Grant and Public Installation," http"//textarc.org.
"Textarc: The Print and the Artist," http://textarc.org.
Courter et al., Microsoft Office 2000 Professional Edition, 1999, Sybex Inc., pp. xxxi, 543, 685.
Harrison et al., "Transparent Layered User Interfaces: An Evaluation of a Display Design to Enhance Focused and Divided Attention" ACM, 13 pages, 1995.
Ishii et al., "Iterative Design of Seamless Collaboration Media", Communications of the ACM, Aug. 1994, vol. 37, pp. 83-97.
Office Action U.S. Appl. No. 10/416,885 Jun. 15, 2006.
Office Action U.S. Appl. No. 10/416,885 Nov. 2, 2005.
Office Action U.S. Appl. No. 10/475,432 Feb. 1, 2006.
Office Action U.S. Appl. No. 10/475,432 Feb. 26, 2007.
Office Action U.S. Appl. No. 10/475,432 Jul. 28, 2006.
Office Action U.S. Appl. No. 10/475,432 Sep. 27, 2005.
Office Action U.S. Appl. No. 10/475,432 Oct. 5, 2007.
Office Action U.S. Appl. No. 10/475,432 Dec. 20, 2007.
Office Action U.S. Appl. No. 10/492,624 Aug. 1, 2007.
Office Action U.S. Appl. No. 10/508,726 Jun. 1, 2007.
Office Action U.S. Appl. No. 10/508,726 Sep. 21, 2007.
Office Action U.S. Appl. No. 10/508,726 Dec. 11, 2006.
Office Action U.S. Appl. No. 11/402,847 Jan. 14, 2008.
Office Action U.S. Appl. No. 11/402,847 Jun. 4, 2007.
Office Action U.S. Appl. No. 11/402,847 Sep. 12, 2007.
Office Action U.S. Appl. No. 11/402,847 Nov. 16, 2006.
"Kodak Datashow HR/M Projection Pad", Motion Picture & Audio-visual Products, Eastman Kodak Co., 1988.
Alampiev et al., "Technology of the Three Dimensional Electronic Matrix for Liquid Crystal Display" Jan. 1, 1976.

(56) References Cited

OTHER PUBLICATIONS

Blundell et al., "Volumetric Three-Dimensional Display Systems", pp. 1-7.
Buzak, "CRT Displays Full-color 3-D Images".
Cole, et al.; "A Three-Dimensional Display for Radar Returns", pp. 52-53.
General Electric, "3-D Liquid Crystal Display for Mine Detecting Radar" Apr. 1, 1974.
Hattori, T. et al,; "Spatial Modulation Display Using Spatial Light Modulators", Optical Engineering, vol. 31, No. 2, pp. 350-352, (Feb. 1992).
Kozo, T. "Three-Dimentional Display System by Laminated Llquid Crystal Display Device", Patent Abstracts of Japan 02-262119 A, vol. 15, No. 19, pp. 1153, (Jan. 16, 1998).
L.F. Hodges et al., "True Three-Dimensional CRT-Based Displays," Infor. Display, pp. 18-22 (May 1987).
Minoru, T. "Displaying Method for Stereoscopic Image Using Liquid Crystal Display Element", Patent Abstracts of Japan 62-235929 A, vol. 12, No. 102, pp. 684, (Apr. 5, 1998).
Tamura et al., "Multilayer 3-D Display Adapter", Applied Optics, vol. 17, No. 23, pp. 3695-3696 (Dec. 1, 1978).
Technical Report of the Institute of Television Engineers of Japan, vol. 20, No. 5, Feb. 1996.
Tomohiko Hattori et al: "Spatial Light Modulators" Optical Engineering, vol. 31, No. 2, Feb. 1, 1992, pp. 350-352.
Kozo, T. "Three-Dimentional Display System by Laminated Liquid Crystal Display Device", Patent Abstracts of Japan 02-262119 A, vol. 15, No. 19, pp. 1153, (Jan. 16, 1998).
Final OA Dated Feb. 24, 2009; U.S. Appl. No. 10/528,334.
Non Final OA Dated Jan. 5, 2009; U.S. Appl. No. 10/492,624.
Non Final OA Dated Apr. 14, 2009; U.S. Appl. No. 10/475,432.
Non-Final Office Action Dated Sep. 1, 2009; U.S. Appl. No. 10/528,334.
Non-Final Office Action Dated Dec. 28, 2009; U.S. Appl. No. 12/046,265.
Office Action dated Feb. 5, 2010; U.S. Appl. No. 10/492,624.
Non-Final Office Action Dated Jun. 22, 2009; U.S. Appl. No. 10/492,624.
Office Action Mailed Jul. 9, 2010; U.S. Appl. No. 12/046,265.
Office Action Mailed Oct. 8, 2010; U.S. Appl. No. 10/492,624.

* cited by examiner

MULTILAYER VIDEO SCREEN

RELATED APPLICATIONS

This application is a National Stage of International Application No. PCT/NZ2003/000153, filed Jul. 15, 2003, which published in English. The entire disclosure of the International Application No. PCT/NZ2003/000153 is incorporated herein by reference.

TECHNICAL FIELD

This invention relates to methods of providing improved quality video display system.

BACKGROUND ART

A method of creating the appearance of depth in video displays is to use a multilayer display system typically comprising at least two parallel coaxial video screens separated by between 10 and 100 millimetres in depth. The rear screen can be larger than the front screen and the screens are preferably separated by a slab of clear material of refractive index substantially greater than 1 which both supports the two screens and helps avoid the effect of looking through a window in that the edges of the view between the screens are made to largely disappear. The front screen is transparent except where its pixels are activated to create a display so that it is possible to see behind much of the front screen to the background shown on the rear screen. Backlighting for the front screen is provided by illumination from the rear screen or more commonly a common backlight is used for both screens, being placed behind the rear screen which for this case is also transparent except where pixels are activated. The front screen can also be formed from transparent electro-luminescent technology where pixels and sub-pixels produce their own light. With the backlit system it is found that there is sufficient diffusion of light from the back screen even when activated to allow normal colour vision on the front screen as well.

Multi-layered display (MLD) units provide a significant improvement over existing single layer display (SLD) units or displays. MLD units may be used to nest display content over spacially displaced or stacked layers to provide an enhanced mechanism for information absorption and analysis by users. An example of an existing multi-layer display is discussed for example in WO9942889 A.

Reference throughout this specification will also be made to the present invention being used in conjunction with multi-layer displays of the type disclosed in WO9942889A. However, those skilled in the art should appreciate that the present invention may also be adapted for use with other types of MLD units and reference to the above only throughout this specification should in no way be seen as limiting.

It is known from studies of human vision that the human eye is more sensitive to intensity than colour in interpreting detail in images. Furthermore, of the primary colours red green and blue, the eye is least sensitive to blue. The relative sensitivity of the eye to red is 0.51 compared to green and to blue is 0.19. Accordingly a video image in which the blue sub-pixels are up to 5 times the area of the green sub-pixels shows no obvious visual loss of resolution compared to an image in which the blue sub-pixels are the same size as the green sub-pixels. Therefore it is possible to reduce the cost of a video pixel system by using a smaller number of larger blue sub-pixels without losing resolution.

A pixel is defined as the smallest resolvable area of an image on a display device. Each pixel in a monochrome image has its own brightness, from 0 for black to the maximum value (e.g. 255 for an eight-bit pixel) for white. In a colour image, each pixel has its own brightness and colour, usually represented as a triple of red, green and blue intensities. To turn on a pixel, the integrated circuit sends a charge down the correct column of one substrate and a ground activated on the correct row of the other. The row and column intersect at the designated pixel and that delivers the voltage to untwist the liquid crystals at that pixel. A sub-pixel is the colour filter and its components.

Liquid Crystal Displays depend on thin film transistors (TFT). Thin film transistors are tiny switching transistors and capacitors. They are arranged in a matrix on a glass substrate and often referred to as the black matrix. To address a particular pixel, the proper row is switched on, and then a charge is sent down the correct column. Since all of the other rows that the column intersects are turned off, only the capacitor at the designated pixel receives a charge. The capacitor is able to hold the charge until the next refresh cycle. And if the amount of voltage supplied to the crystal is carefully controlled, it can be made to untwist only enough to allow some light through. By doing this in very exact, very small increments, Liquid Crystal Displays can create a grey scale. Most displays today offer 256 levels of brightness per pixel.

The basic form of the multilayer display as described above suffers from certain problems. When similar liquid crystal display screens are used for both the front and rear screens the display suffers from a Moiré fringe pattern which makes it unusable. Moiré interference is usually described as "an independent usually shimmering pattern seen when two geometrically regular patterns (such as two sets of parallel lines or two liquid crystal display screens) are superimposed especially at an acute angle". The independent pattern seen is the result of the interference between the two or more regular patterns. This can be circumvented as disclosed in patent WO9942889A such as by placing at least one light diffusing layer immediately in between display layers. However one effect of the diffusion screen is to reduce the sharpness of the rear screen to viewers. Another undesirable effect is to reduce the contrast of the rear screen to viewers.

A further problem with the system is that it is difficult to get sufficient brightness from the backlighting for the display. By improving the transparency of one or more of the pixel patterns the brightness of the image seen in the display can be improved.

The contrast sensitivity of the human visual system is the capability of the latter to detect the difference in brightness between neighboring regions in a scene. A high sensitivity means the ability to distinguish small differences in brightness. Human visual contrast sensitivity is largely dependent upon the sizes of the neighboring regions in question. That is, the sensitivity is a function of spatial frequency. Many psychophysical experiments have been conducted to determine how the human visual contrast sensitivity varies with spatial frequency. Most often used as test scenes are bar patterns or gratings with different spatial frequencies and contrast. For each frequency, gratings of different contrast are shown to human subjects to determine the lowest contrast discernible. It turns out that the human visual contrast sensitivity also varies with the orientation of the grating; it achieves the highest value when a grating is horizontally or vertically oriented and achieves the lowest value when a grating is oriented at 45 degrees from horizontal. Different results are obtained by different experimenters due in part to different experimental conditions and assumptions. However, all the results show that the human visual contrast sensitivity, as a function of spatial frequency, varies in a curve. The curve has the normalized sensitivity and is based on the data obtained by several experimenters. In most experimental results the spatial frequency is expressed in terms of cycles per degree of a subject's field of view. This unit is translated to cycles per inch (cpi) at a normal viewing distance of 12 inches. The peaks of the curves from different experimenters range from about 10 cycles per inch to 50 cycles per inch with an average of about 20 cycles per inch. The sensitivity drops rapidly at frequencies away from the peak frequency.

Reference throughout this specification will now be made to the present invention as applying to video screens for a multilayer display system. However, it should be appreciated by those skilled in the art that other types of displays using one or more screens may be used in conjunction with the invention.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

Accordingly, in a first aspect the invention may broadly be said to consist in a multi layer display device comprising at least two display layers at least in part overlapping in which at least one of said display layers has a dissimilar configuration to the other display layer(s) such that moiré interference is reduced.

The term "dissimilar configuration" as used here-in should be interpreted to mean any different arrangement at the component and/or sub-component level such as for example, a variation in pixel pattern, the use of a different technology, or the re-arrangement of sub-pixels such as colour filters.

The term "display layer" as used here-in should be interpreted to mean any device for displaying images which may include (without limitation) LCD, OLED, Projection Display Devices; however the technology employed needs to allow the images displayed on rear layer(s) be viewable though overlapping areas of front layer(s). As such at the least all but the rear layer will need to be transparent (at least in part) or transmissive to light (at least in part). In the case where a backlighting system is the sole source of light to illuminate images the rear most layer will also need to be transparent (at least in part) or transmissive to light (at least in part).

Preferably the dissimilarity in configuration between the at least two display layers is that they are different display technologies. Alternatively they may be the same display technology for example (without limitation) LCDs but with dissimilarities in their components for example (without limitation) at the pixel and/or sub-pixel level.

Generally, the greater the dissimilarity between the configuration of the at least two display layers that have dissimilar configurations; the less moiré interference will be experienced when those display layers are overlapped.

Accordingly, in a further aspect the invention may broadly be said to consist in a multi layer display device comprising at least two display layers which have tessellated pixel patterns and which are at least in part overlapping in which at least one of said display layers has a dissimilar pixel pattern to the other display layer(s) such that moiré interference is reduced.

The term "pixel pattern" as used here-in should be interpreted to mean the arrangement of the pixels on a display layer.

The term "tessellated pixel pattern" as used here-in should be interpreted to mean any regular pixel pattern which is repeated over the display layer. By way of example (and without limitation) a simple tessellated pixel pattern would be a checker-board arrangement of square pixels. A more complicated example would be (without limitation) a hexagonally shaped pixel. However the pixels tessellated together need not be the same shape and may be any combination of like and unlike pixels tessellated together.

Preferably the dissimilarity in pixel pattern between the at least two display layers is that on each layer the pixels that are tessellated are different in shape to the pixels that are tessellated on other display layer(s).

Generally, the greater the dissimilarity or the lesser the "correlation" between the pixel patterns on the at least two display layers that have dissimilar pixel patterns; the less moiré interference will be experienced when those display layers are overlapped.

The term correlation as used here-in is used to measure the degree at which two or more signals are related. For example a correlation co-efficient of 1 would be two identical patterns and a co-efficient of 0 would be two completely unlike patterns.

Accordingly, in a further aspect the invention may broadly be said to consist in a multi layer display device comprising at least two display layers which have tessellated pixel patterns and which are at least in part overlapping in which at least one of said display layers has a dissimilar sub-pixel pattern to the other display layer(s) such that moiré interference is reduced.

The term 'sub-pixel pattern' as used here-in should be interpreted to mean the arrangement of the sub-pixels being the colour filters and their associated components.

Preferably the dissimilarity in sub-pixel pattern between the at least two display layers is that on each layer the sub-pixels are different in shape and/or arrangement to the sub-pixels that on other display layer(s). For example (and without limitation) in typical display devices a red, green and blue sub-pixel or colour filter is used. By re-arranging their layout, shape and/or size (or even the materials which are used to make up those sub-pixels), moiré interference will be change when such display layers are overlapped.

Generally, the greater the dissimilarity or the lesser the "correlation" between the sub-pixel patterns on the at least two display layers that have dissimilar sub-pixel patterns, the less moiré interference will be experienced when those display layers are overlapped.

Preferably the pixel and sub-pixel patterns employed allow a high transmissivity of light through the front display layer(s) to the viewer.

Alternatively and at its most simplest the use of a different materials at the component and/or sub-component can create a dissimilarity in the pixel pattern and/or sub-pixel such as (without limitation) if a different material is used for the black matrix which encompasses each pixel causing for example (without limitation) a thicker or thinner or more transmissive black matrix, a different pixel pattern will be present.

Accordingly, in a further aspect the invention may broadly be said to consist in a multi layer display device comprising at least two display layers which have tessellated pixel patterns and which are at least in part overlapping in which at least one of said display layers has a dissimilar sub-pixel pattern to the other display layer(s) such that moiré interference is reduced and where said dissimilarity between pixels on different display layers is that at least one of the borders of said pixels has (have) different curvature.

Preferably the at least one curved pixel border will be tessellated with its neighbouring pixels.

Accordingly, in a further aspect the invention may broadly be said to consist in a multi layer display device comprising at least two display layers which have tessellated sub-pixel patterns and which are at least in part overlapping in which at least one of said display layers has a dissimilar sub-pixel pattern to the other display layer(s) such that moiré interference is reduced and where said dissimilarity between pixels on different display layers is that at least one of the borders of said sub-pixels has (have) different curvature.

Preferably the at least one curved sub-pixel border will be tessellated with its neighbouring sub-pixels.

Accordingly, in a further aspect the invention may broadly be said to consist in a multi layer display device comprising at least two display layers which have tessellated pixel patterns and which are at least in part overlapping in which at least one of said display layers has a dissimilar pixel and/or sub-pixel pattern to the other display layer(s) such that moiré interference is reduced and where said dissimilarity between display layers is that at least one of the boundaries of the pixels and/or the sub-pixels are at an angle to one another.

Accordingly, in a further aspect the invention may broadly be said to consist in a multi layer display device comprising at least two display layers which are at least in part overlapping where the display layers are configured such that the overlap of like components on different display layers that are contributing to moiré interference is arranged in such a way that each such moiré contributing component is overlapping a dissimilar component on the other display layer(s) and thereby moiré interference is reduced.

Accordingly, in a further aspect the invention may broadly be said to consist in a multi layer display device comprising at least two display layers which are at least in part overlapping where the display layers are configured such that the overlap of like sub-components on different display layers that are contributing to moiré interference is arranged in such a way that each such moiré contributing sub-component is overlapping a dissimilar sub-component on the other display layer(s) and thereby moiré interference is reduced.

Preferably there is no overlap of similar components and/or sub-components but alternatively and more practically any reduction in overlap of similar components and/or sub-components will affect moiré interference, such that part but minimal overlap of like components and/or sub-components is preferred.

Correlation

Accordingly, in a further aspect the invention may broadly be said to consist in a multi layer display device comprising at least two display layers which are at least in part overlapping in which at least two of said display layers have components surrounded by black matrix and the overlap of said black matrix on different display layers is arranged such that the pattern of black matrix on a layer is overlapping a dissimilar pattern of black matrix on the other layer(s).

Preferably there is no overlap of similar black matrix pattern but alternatively and more practically any reduction in overlap of similar black matrix pattern will affect moiré interference, such that part but minimal overlap of similar black matrix pattern is preferred.

Accordingly, in a further aspect the invention may broadly be said to consist in a multi layer display device comprising at least two display layers which are at least in part overlapping in which at least two which are comprised of sub-pixels including colour filters and the overlap of said sub-pixels on different display layers is arranged such that the pattern of sub-pixels on a layer is overlapping a dissimilar pattern of sub-pixels on the other layer(s).

Preferably there is no overlap of similar sub-pixels and/or sub-pixel patterns but alternatively and more practically any reduction in overlap of sub-pixels and/or sub-pixel pattern will affect moiré interference, such that part but minimal overlap of similar black matrix pattern is preferred.

Accordingly, in a first aspect the invention may broadly be said to consist in a display multi layer device comprising at least two display layers at least in part overlapping in which at least one of said display layers has a dissimilar configuration such as (without limitation) dissimilar pixel and/or sub-pixel patterns to the other display layer(s) such that moiré interference is reduced and moiré interference is additionally reduced through the use of at least one transmissive, light diffusing interstitial layer between display layers.

According to one aspect of the present invention there is provided a method of making a multilayer display system wherein:

a) Image formation layers are chosen so as to render the moiré interference produced substantially indistinguishable to the human visual system;

b) Different pixel patterns may be chosen on the front and rear image formation layers to prevent the formation of Moiré fringe patterns substantially distinguishable to the human visual system;

c) Different sub-pixel patterns may be used on the front and rear image formation layers to prevent the formation of Moiré fringe patterns substantially distinguishable to the human visual system;

d) Sub-pixel patterns may be contained within a tessellated geometric pattern where the edges of the sub pixels may be curved and the shape of the sub-pixels may be chosen to avoid moiré interference;

e) On one or all image formation layers for each sub-pixel may typically surrounded by sub-pixels of a different colour;

f) Sub-pixels and pixels may be arranged on one or both screens in a tessellated pattern to simplify manufacture and to optimise the connections to the rows and columns;

g) The slope of the borders of the pixels formed on a previous screen may be at an angle between 1 degree and 90 degrees to those of a subsequent screen;

h) The slope of the borders of the sub-pixels formed on a previous screen may be at an angle between 1 degree and 90 degrees to those of a subsequent screen; and/or i) Interstitial layers are placed between the image formation layers so as to prevent the formation of moiré interference whilst not producing changes in the sharpness, brightness and chromatic features of the image formation layers, which are substantially distinguishable by the human visual system;

In theory, moiré interference in layered displays appears when geometrical patterns with a similar spatial frequency are overlaid. The resulting interference occurs as a variation in density of the interfering elements and has a much larger period than the contributing patterns. In multi-layered displays this description can divide further by considering three separate geometric patterns which can be, depending on the technology employed a) the black pixel matrix b) the column and row lines and other opaque driving electronics c) colour filters The interference between subsequent black pixel matrices appears as a periodic variation in the density of the black lines in both the horizontal and vertical directions. And while individual lines may be too small to be detected when each pattern is viewed separately, the periodic variation in density may be detectable and is often annoying to the viewer. The same can be said for the driving electronic matrix.

The interference between subsequent colour filter elements appears as sets of large fringes, each set composed of distinct colours similar to those in the contributing pattern. Individual fringes appear when colour filters of the same type appear overlapping or partially overlapping to the viewer. The perceived colour of the fringes is less saturated than that of the contributing filters because overlapping of dissimilar colour filters does not produce black.

In order to achieve minimal moiré interference perception the contrast and spatial frequency of the moiré fringes produced needs to be below the threshold of the human visual system. Since the frequency of the moiré interference varies depending on the viewing distance and the distance between the layers and it is preferable that these parameters free for other purposes, counter measures need to be directed towards lessening the contrast of the interference.

To achieve minimal contrast in the resulting fringes by the layers the shape of the colour sub-pixels on separate layers has to be chosen carefully, so that when the patterns are overlaid there is minimal variation in the area of intersection of the colour stripes as one moves along the horizontal or vertical axis of the display. The patterns may be formed by dividing the simple geometric shapes forming the tessellation into different sub-pixel regions with straight or curved borders.

Whilst using dissimilar pixel and sub-pixel arrangements may be a useful counter measure to moiré interference additional, although minimal blurring of the sub-pixels may still be necessary to reduce the contrast of the moiré fringes and hence make them imperceptible to human visual system, this is best achieved with a directional diffuser. The simplest form of which is made by interfering a plane or diverging wave with a diffuse wave in either a reflection or transmission format. The resulting hologram will reconstruct the diffuse source when illuminated at the original angle. The position and size of the original diffuse source will determine the projection zone and the gain of the screen. A small diffuse source recorded a meter away from the holographic plate will form a very high gain screen that is visible only when the viewer is in the angular zone subtended by the small source at 1 meter.

The directional diffuser effectively blurs the image by taking light emitted by the image and randomly changes its direction by an angle somewhere between zero and the projection angle. Since the directional diffuser is placed at a particular distance from the image formation layer light appears to have come from a point a small distance from its actual origin. By changing both projection angle and the distance from the image formation layer, both the gain of the display and image blur size can be controlled. The image should be spread as uniformly as possible over a distance of at least one pixel, thus decreasing the contrast of the small features that contribute to the moiré interference and hence the viewers perception of it. It is preferable to spread the image of the sub-pixel no more than one pixel since this can over blur the image, decreasing its visibility. Since most existing technology is optimised to be viewable from all angles it is desirable to make the projection angle as small as practically possible and have the holographic diffuser at a large distance from the image formation layer, so as not to loose contrast of the overall display. Whilst the holographic diffusion pattern may be recorded using a laser and mask arrangement it can be reproduced, and indeed any diffusion pattern may be produced to within a given tolerance by many different methods. One such method is calenderending where an adhesive, usually epoxy that is curable by ultra-violet radiation, is applied to the desired surface and a 3D negative impression of the surface, on a transparent substrate, to be reproduced is pushed into the adhesive. The adhesive is then cured by applying the UV radiation through the substrate, and the substrate removed leaving a surface impression. Also the pattern may be applied to the surface during its manufacturing process, such as embossing the pattern onto a plastic sheet whilst the surface is still soft. It also may be applied using material removal systems such as acid or abrasion.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
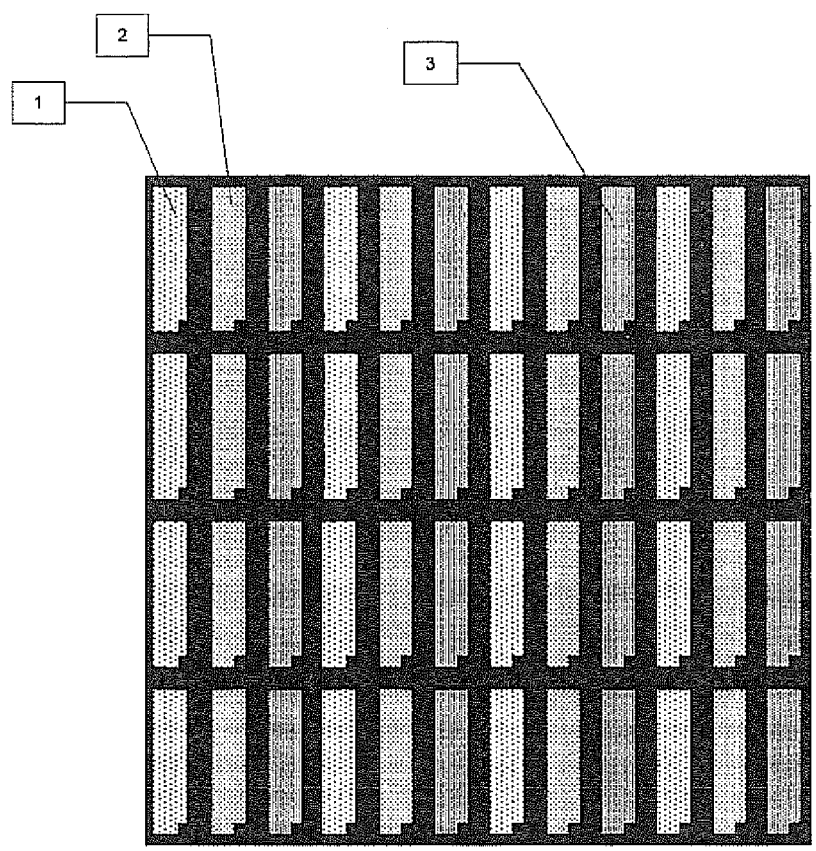
FIG. 1 illustrates a diagrammatic view of a pixel where the sub pixels are in the vertical stripe arrangement.

FIG. 1 illustrates a diagrammatic representation of a typical LCD panel consisting of a tessellated pixel pattern consisting of a red sub pixel (1), a green sub pixel (2), and a blue sub pixel (3).

Figure 2:
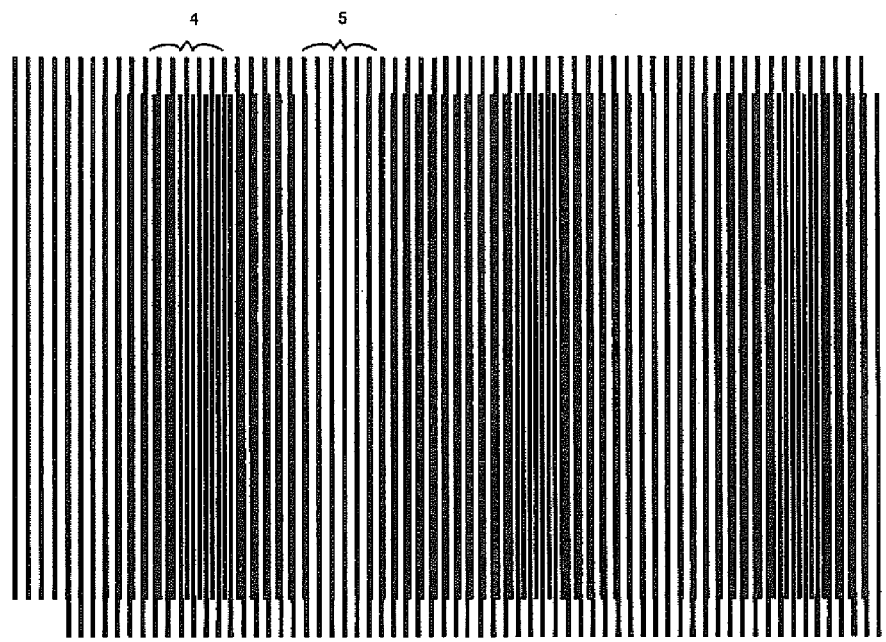
FIG. 2 illustrates a diagrammatic view of a moiré interference pattern in where the black lines represent one colour from a stripe pattern pixel.

FIG. 2 illustrates a diagrammatic view of a moiré interference pattern in where the black lines represent one colour from a display layer utilising a stripe pattern pixel overlapping another display utilising a strip pattern pixel. The vertical section delimited by braces shows where the moiré pattern is most dense (4) and the vertical section delimited by braces shows where the interference is least dense (5).

Figure 3:
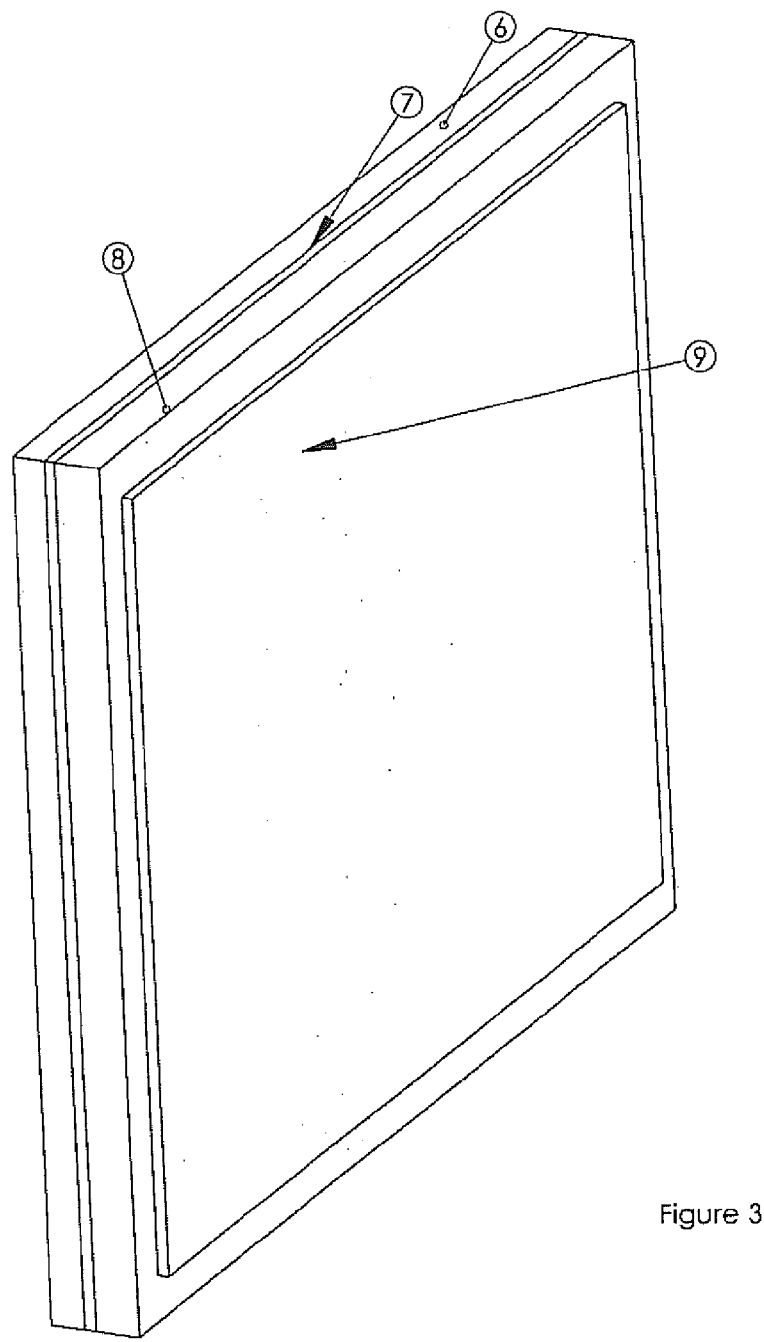
FIG. 3 illustrates an oblique view of a preferred embodiment of the multi layer display.
Figure 4:
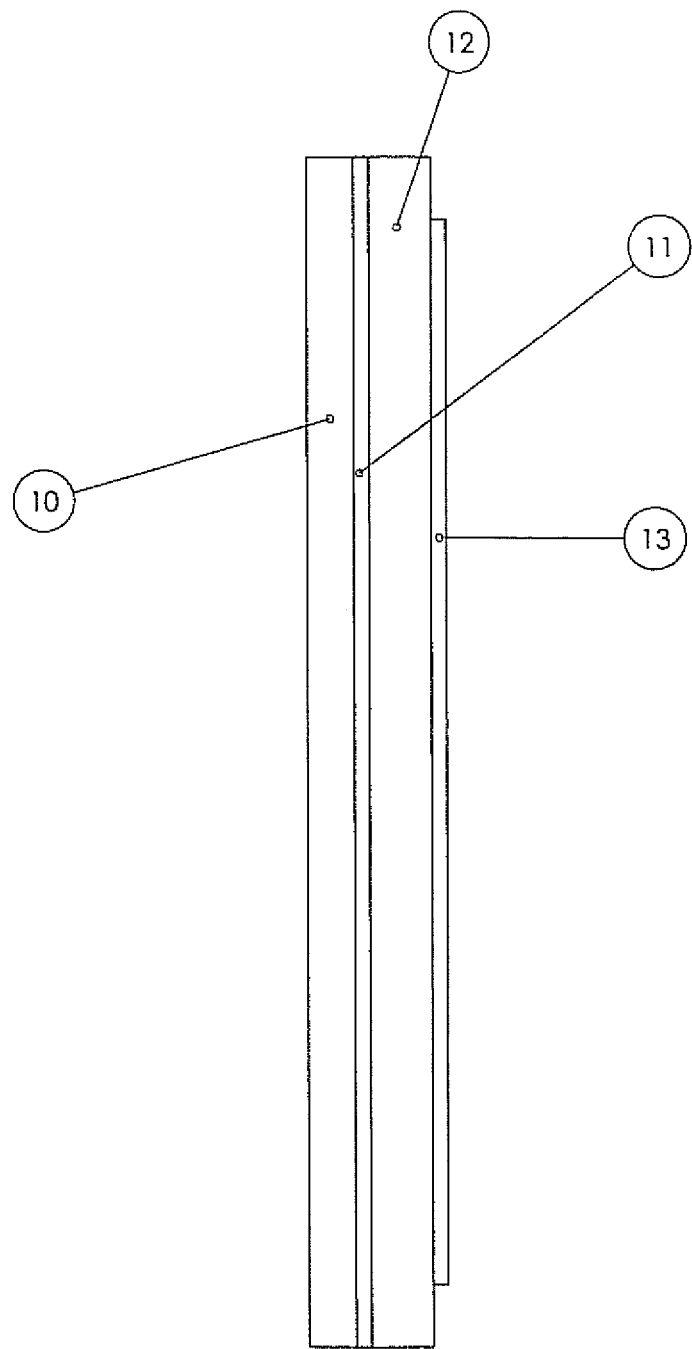
FIG. 4 illustrates a profile view of a preferred embodiment of the multi layer display.
Figure 5:
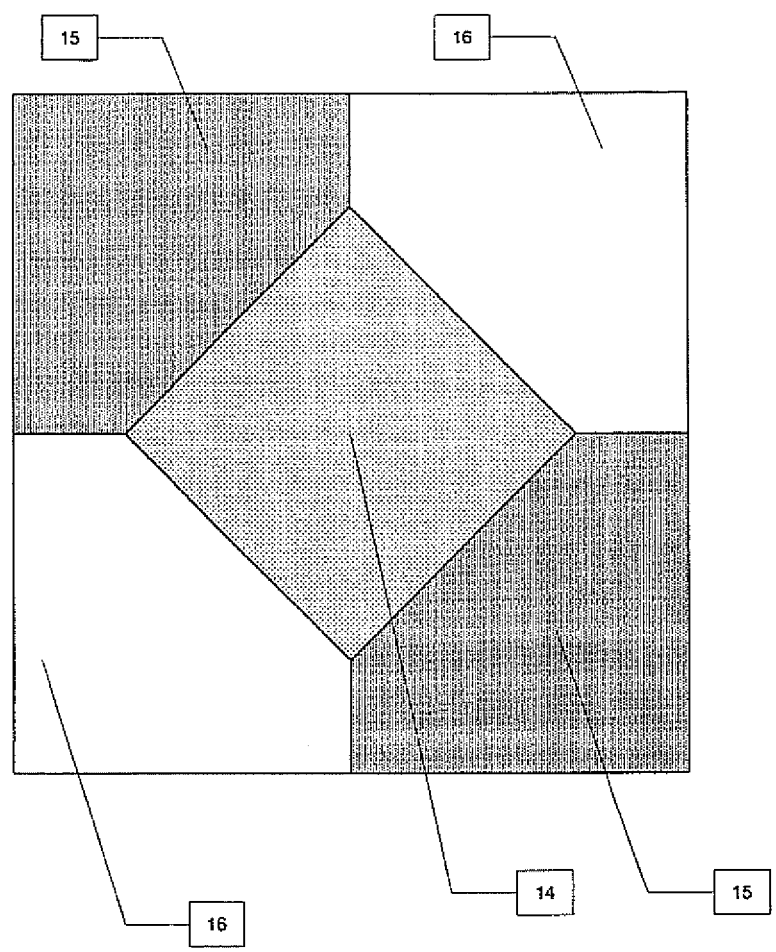
FIG. 5 illustrates an example of a sub pixel of an alternative arrangement.
Figure 6:
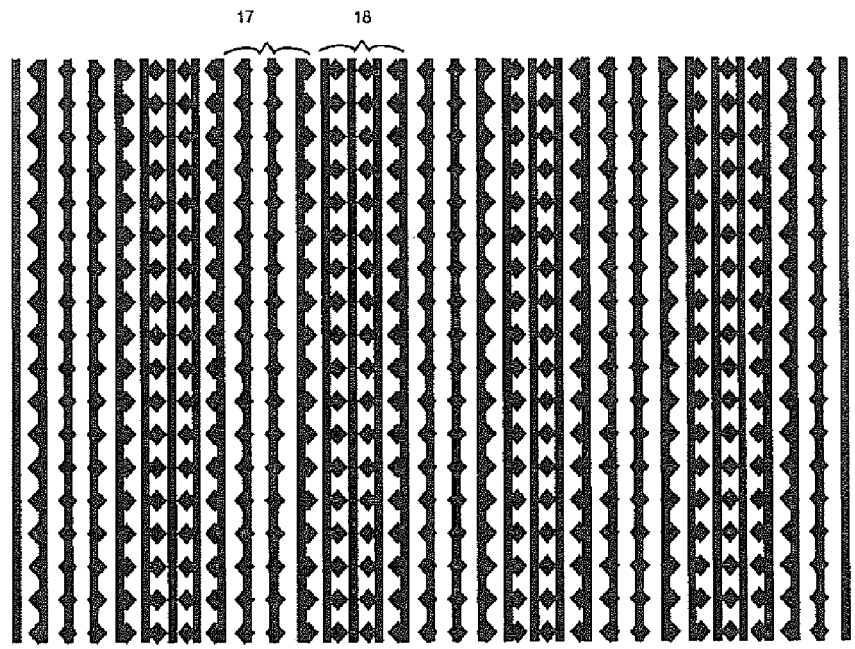
FIG. 6 illustrates the moiré interference produced by the centre blue region of a preferred embodiment.

FIG. 3 illustrates a preferred embodiment of the invention being a multi-layered display composed of a backlight (6) lighting two image formation layers or display layers (7) and (9) both of which are (at least in part) transparent or transmissive to light and interstitial transmissive light diffusing films (8) all of which are co-linear. In a typical embodiment of a multi layer display the display layers utilise the pixel and sub-pixel arrangement illustrated in FIG. 1 however in the preferred embodiment illustrated the display layers utilise different configurations, such that display layer 7 has tessellated pixels of the arrangement illustrated in FIG. 1 while display layer 9 utilises the pixel arrangement illustrated in FIG. 5 in which a centre blue sub-pixel or colour filter (14) is diamond in shape with straight edges and which is placed within a square and surrounded by red (15) and green (16) sub pixels which occupy the remaining area within the pixel boundaries. The resulting moiré interference from overlapping these pixel patterns (assuming that the interstitial transmissive light diffusing films have no effect on moiré interference) is illustrated in FIG. 3 which is a diagrammatic representation of moiré interference produced by the centre blue region in this preferred embodiment. In FIG. 6 there is less difference when compared to FIG. 2 in density between the less dense vertical region delimited by braces (17) and the more dense strip delimited by braces (18). Preferably the pixel pattern and sub-pixel patterns utilised will be very transmissive to light.

Figure 7:
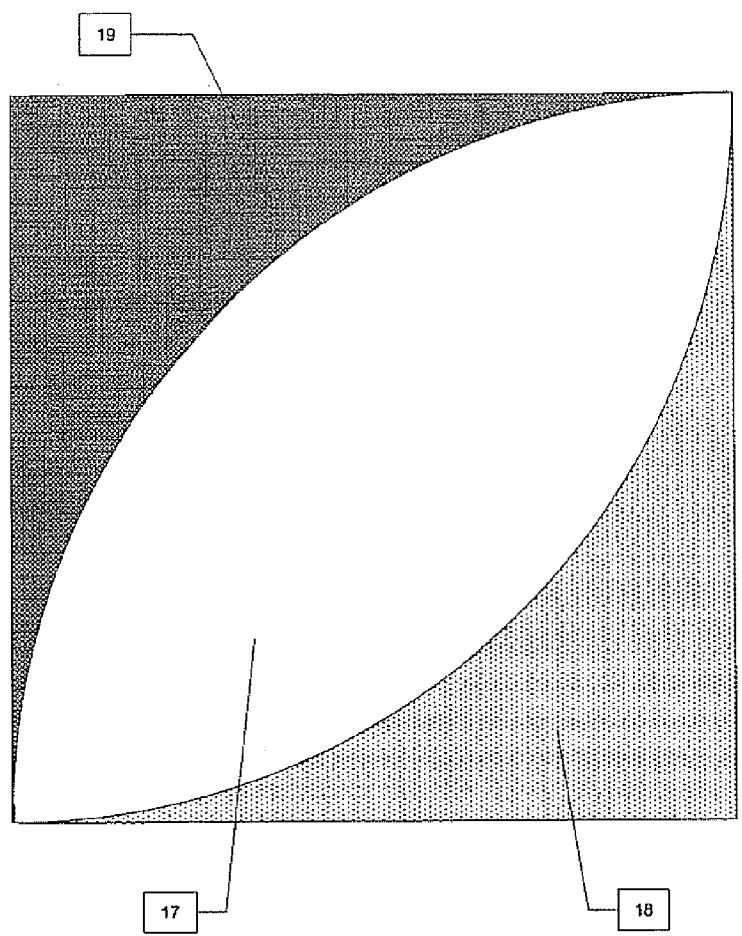
FIG. 7 illustrates a further alternative sub pixel arrangement for use in a preferred embodiment.
Figure 8:
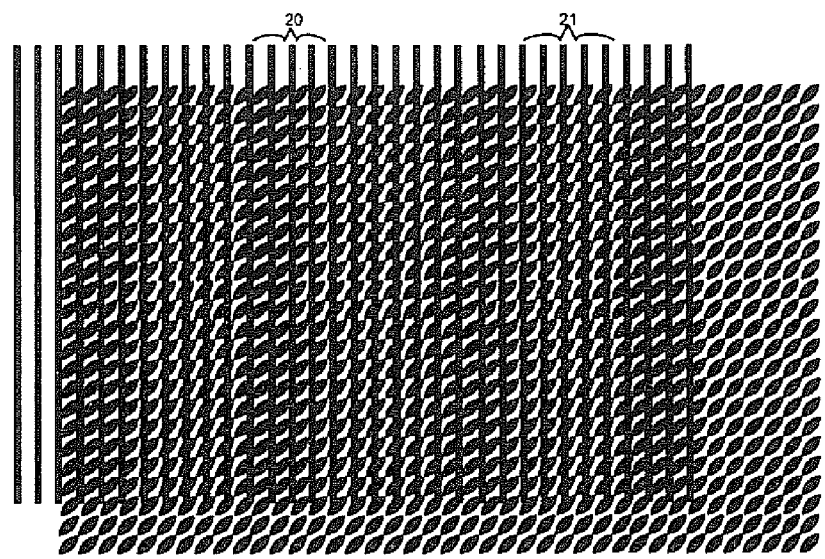
FIG. 8 illustrates the diagrammatic representation of the moiré interference produced by the centre blue region in a preferred embodiment.
Figure 9:
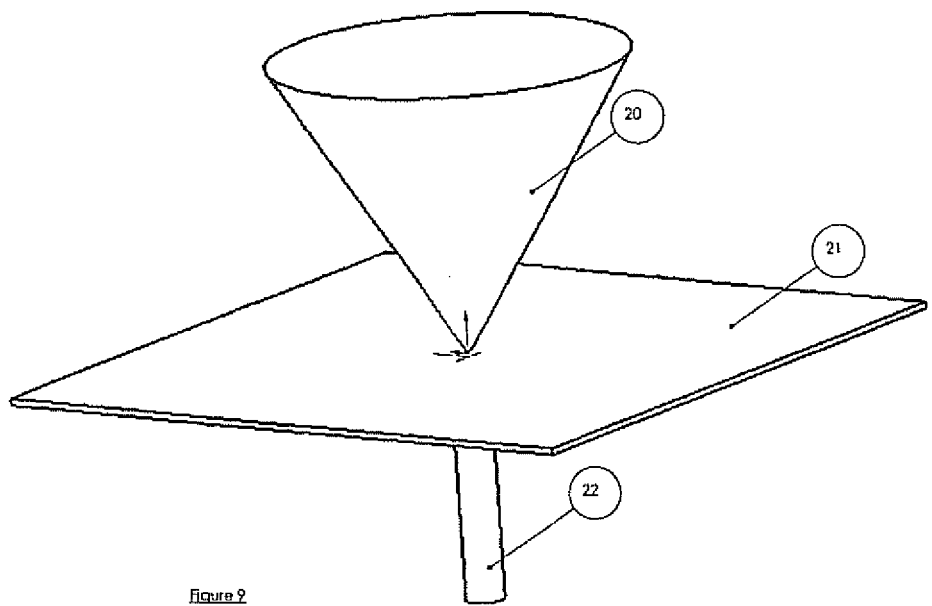
FIG. 9 illustrates the output cone (20) of directional diffuser (21) on light rays (22) emitted from image formation layers.
Figure 10:
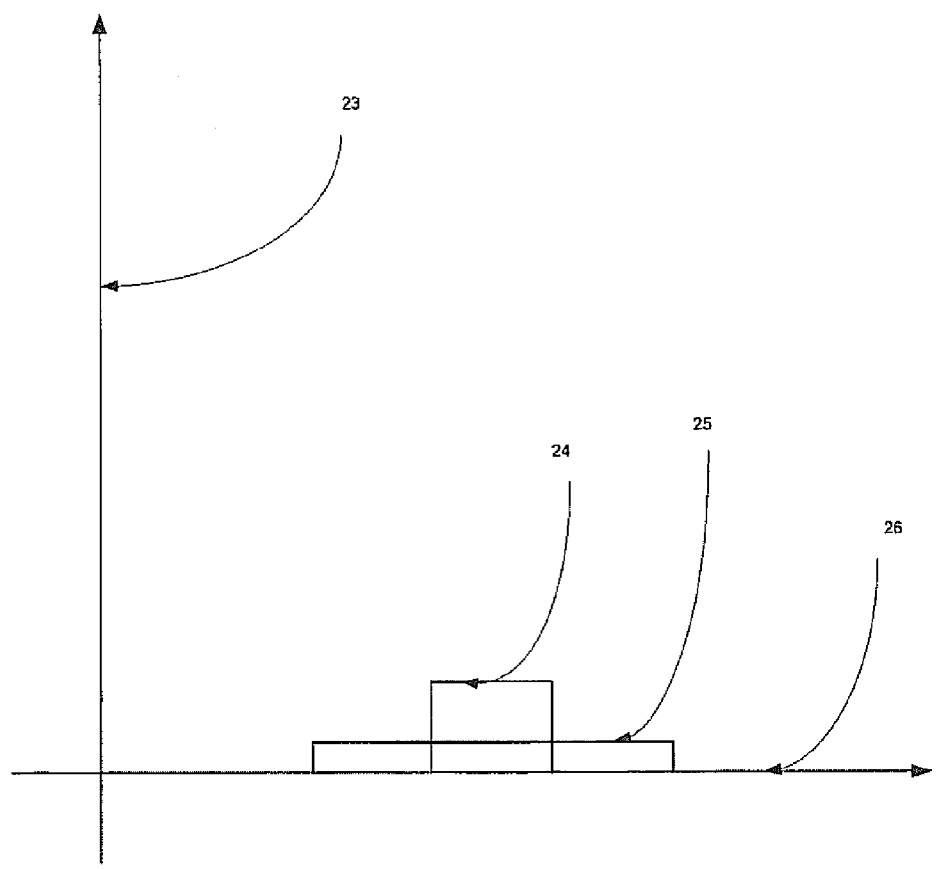
FIG. 10 illustrates an ideal intensity profile (25) of a rectangular sub pixel after being blurred by diffuser, compared with the intensity distribution of sub-pixel (24) before being diffused by diffuser where (25) denotes x-axis and (23) denotes the horizontal axis of the image formation layer.

FIG. 7 illustrates a further alternative sub pixel arrangement where a centre blue sub pixel (17) with arc shaped edges is adjacent to a red sub pixel (18) and a green sub pixel (19). In a preferred embodiment the sub-pixel pattern illustrated in FIG. 7 is utilised in a tessellated fashion on a display layer which overlaps another display layer which uses the pixel pattern illustrated in FIG. 1 again in a tessellated fashion. The resulting moiré interference from overlapping these pixel patterns (assuming that any interstitial transmissive light diffusing films used have no effect on moiré interference) is illustrated in FIG. 8 which is a diagrammatic representation of moiré interference produced by the centre blue region where there is less difference when compared to FIG. 2 in density between the less dense vertical region delimited by braces (20) and the more dense vertical region delimited by braces (21).

Aspects of the present invention have been described by way of example only and it should be appreciated that modifications and additions may be made thereto without departing from the scope thereof.

What we claim is:

1. A multi-component display comprising:
a first display screen comprising a first plurality of pixels, wherein said first display screen is operable to display a first image using said first plurality of pixels, and wherein a first pixel of said first plurality of pixels comprises a first plurality of sub-pixels arranged in a first pattern; and
a second display screen comprising a second plurality of pixels, wherein said second display screen is operable to display a second image using said second plurality of pixels, wherein said second display screen overlaps said first display screen, wherein a second pixel of said second plurality of pixels comprises a second plurality of sub-pixels arranged in a second pattern, wherein said second pattern is different from said first pattern, and wherein an overlap of said first plurality of sub-pixels and said second plurality of sub-pixels is configured to reduce Moiré interference, and wherein said second pixel comprises a square boundary having edges and wherein said second pattern of said second plurality of sub-pixels of said second pixel comprises a blue sub-pixel configured in a diamond pattern with straight edges such that at least one edge of said diamond pattern is not parallel to said edges of said square boundary of said second pixel, and first and second red sub-pixels and first and second green sub-pixel occupy remaining areas of said square boundary.

2. The multi-component display of claim 1, wherein said first plurality of pixels are arranged in a first tessellated pixel pattern, and wherein said second plurality of pixels are arranged in a second tessellated pixel pattern.

3. The multi-component display of claim 1, wherein said first plurality of pixels are arranged in a third pattern, and wherein said second plurality of pixels are arranged in a fourth pattern.

4. The multi-component display of claim 1, wherein said first display screen is selected from a group consisting of a liquid crystal display, a light emitting diode display, an organic light emitting diode display and a projection display device.

5. The multi-component display of claim 1, wherein said second display screen is selected from a group consisting of a liquid crystal display, a light emitting diode display, an organic light emitting diode display and a projection display device.

6. The multi-component display of claim 1 further comprising:
at least one interstitial layer disposed between said first and second display screens.

7. The multi-component display of claim 6, wherein said at least one interstitial layer comprises a diffuser.

8. The multi-component display of claim 1 further comprising:
a component operable to generate light to illuminate said first image and said second image.

9. The multi-component display of claim 1, wherein a first pixel of said first plurality of pixels has a first shape, and wherein a second pixel of said second plurality of pixels has a second shape.

10. The multi-component display of claim 1, wherein a first pixel of said first plurality of pixels has a border with a first curvature, and wherein a second pixel of said second plurality of pixels has a border with a second curvature.

11. The multi-component display of claim 1, wherein a first sub-pixel of said first plurality of sub-pixels has a first shape, and wherein a second sub-pixel of said second plurality of sub-pixels has a second shape.

12. The multi-component display of claim 1, wherein a first sub-pixel of said first plurality of sub-pixels has a border with a first curvature, and wherein a second sub-pixel of said second plurality of sub-pixels has a border with a second curvature.

13. The multi-component display of claim 1, wherein said first plurality of pixels comprises a first plurality of color filters arranged in a first pattern, and wherein said second plurality of pixels comprises a second plurality of color filters arranged in a second pattern.

14. A multi-component display comprising:
  a first display screen comprising a first plurality of pixels, wherein said first display screen is operable to display a first image using said first plurality of pixels, wherein said first display screen utilizes a first display technology, and wherein said first display screen comprises a first black matrix pattern; and
  a second display screen comprising a second plurality of pixels, wherein said second display screen is operable to display a second image using said second plurality of pixels, wherein said second display screen overlaps said first display screen, wherein said second display screen comprises a second black matrix pattern that is different from said first black matrix pattern, wherein said second display screen utilizes a second display technology, and wherein said second display technology is different from said first display technology, and wherein said overlap is configured to reduce Moiré interference.

15. The multi-component display of claim 14, wherein said first plurality of pixels are arranged in a first tessellated pixel pattern, and wherein said second plurality of pixels are arranged in a second tessellated pixel pattern.

16. The multi-component display of claim 14, wherein said first plurality of pixels are arranged in a first pattern, and wherein said second plurality of pixels are arranged in a second pattern.

17. The multi-component display of claim 14, wherein said first display technology is selected from a group consisting of a liquid crystal display, a light emitting diode display, an organic light emitting diode display and a projection display device.

18. The multi-component display of claim 14, wherein said second display technology is selected from a group consisting of a liquid crystal display, a light emitting diode display, an organic light emitting diode display and a projection display device.

19. The multi-component display of claim 14 further comprising:
  at least one interstitial layer disposed between said first and second display screens.

20. The multi-component display of claim 19, wherein said at least one interstitial layer comprises a diffuser.

21. The multi-component display of claim 14 further comprising:
  a component operable to generate light to illuminate said first image and said second image.

22. The multi-component display of claim 14, wherein a first pixel of said first plurality of pixels has a first shape, and wherein a second pixel of said second plurality of pixels has a second shape.

23. The multi-component display of claim 14, wherein a first pixel of said first plurality of pixels has a border with a first curvature, and wherein a second pixel of said second plurality of pixels has a border with a second curvature.

24. The multi-component display of claim 14, wherein said first plurality of pixels comprises a first plurality of sub-pixels, and wherein said second plurality of pixels comprises a second plurality of sub-pixels.

25. The multi-component display of claim 24, wherein a first sub-pixel of said first plurality of sub-pixels has a first shape, and wherein a second sub-pixel of said second plurality of sub-pixels has a second shape.

26. The multi-component display of claim 24, wherein a first sub-pixel of said first plurality of sub-pixels has a border with a first curvature, and wherein a second sub-pixel of said second plurality of sub-pixels has a border with a second curvature.

27. The multi-component display of claim 14, wherein said first plurality of pixels comprises a first plurality of color filters arranged in a first pattern, and wherein said second plurality of pixels comprises a second plurality of color filters arranged in a second pattern.

* * * * *